United States Patent [19]
Ranft et al.

[11] 3,751,915
[45] Aug. 14, 1973

[54] AIR INDUCTION VALVE FOR EXHAUST EMISSION CONTROL SYSTEM

[75] Inventors: Ernst L. Ranft, Webster, N.Y.;
Kenneth R. Pfrengle, Atlanta, Ga.

[73] Assignee: General Motors Corporation, Detroit, Mich.

[22] Filed: Mar. 1, 1971
(Under Rule 47)

[21] Appl. No.: 119,508

[52] U.S. Cl............... 60/290, 60/293, 60/308
[51] Int. Cl.............................. F02b 75/10
[58] Field of Search............... 60/289, 290, 293, 60/304, 305, 308

[56] References Cited
UNITED STATES PATENTS 3,392,523  7/1968  Hyde.................... 60/290
3,543,510  12/1970  Kauffmann............ 60/290
3,653,212  4/1972  Gast..................... 60/293
3,662,541  5/1972  Sawada................. 60/293

*Primary Examiner*—Douglas Hart
*Attorney*—Jean L. Carpenter and Arthur N. Krein

[57] ABSTRACT

An air induction valve for use in the air injection unit of an exhaust emission control system for an internal combustion engine in which exhaust pressure pulsations are used to induce air flow through the air injection unit, the air induction valve including check valves to permit the ingress of air into the air injection unit while preventing egress of exhaust gases therefrom and a diaphragm actuated control valve to prevent air injection during engine deceleration.

8 Claims, 5 Drawing Figures

Patented Aug. 14, 1973
3,751,915
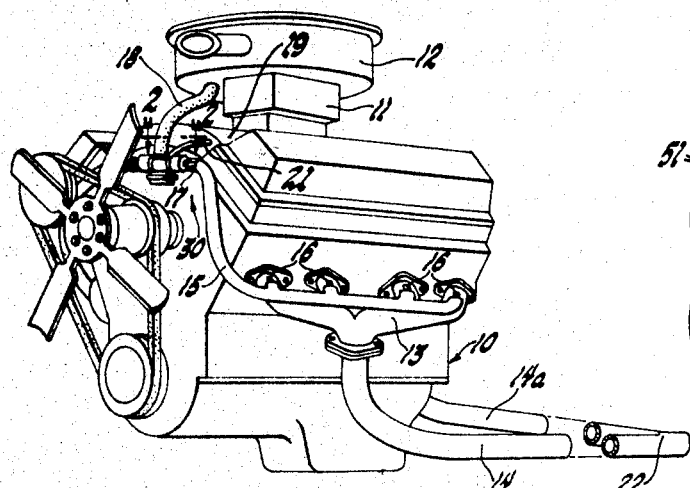
Fig.1
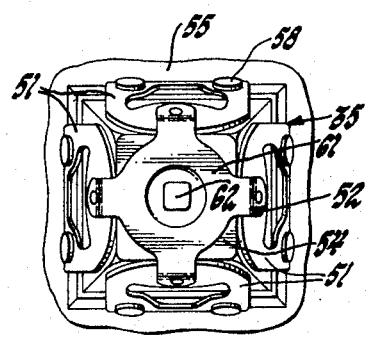
Fig.3
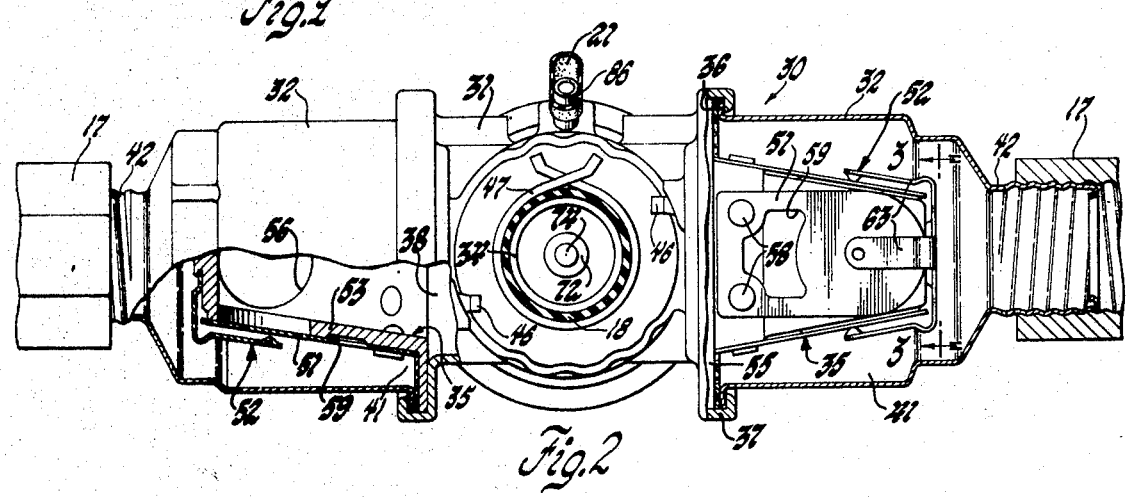
Fig.2
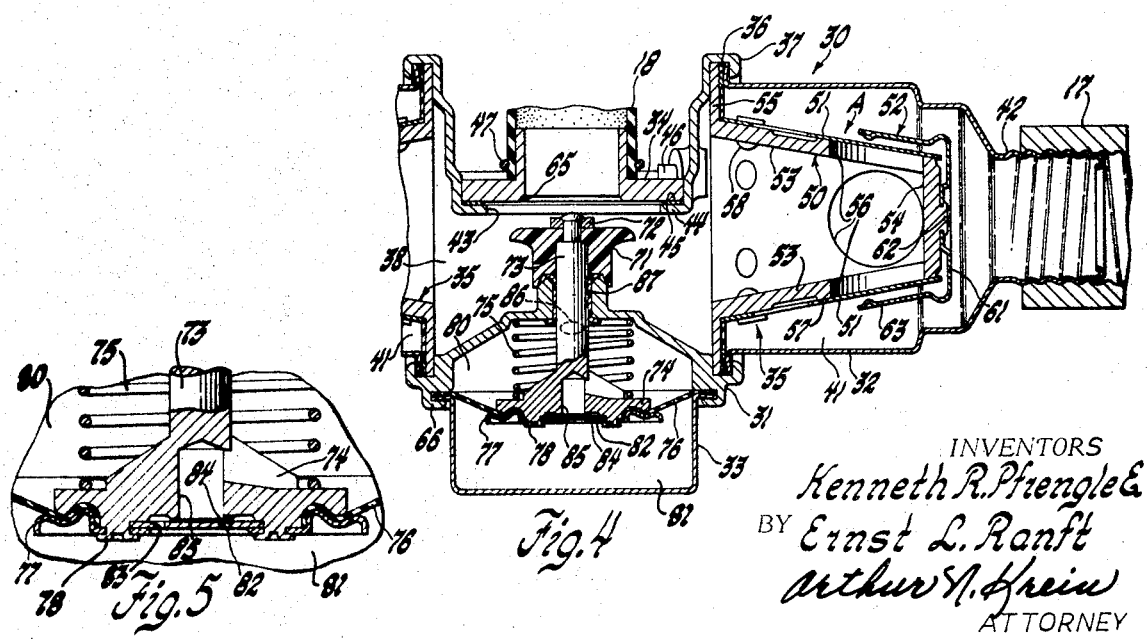
Fig.5
Fig.4
INVENTORS
Kenneth R. Pfrengle &
BY Ernst L. Ranft
Arthur N. Krein
ATTORNEY

AIR INDUCTION VALVE FOR EXHAUST EMISSION CONTROL SYSTEM

This invention relates to an emission control device and, specifically, to an air induction valve for use on the air injection unit of an exhaust emission control system of an internal combustion engine in which exhaust system pressure pulsations are used to induce air flow to the exhaust ports of the engine to deliver air to the stream of exhaust gases as they are emitted from the engine combustion chambers.

During recent years, increasing emphasis has been placed on reducing the amount of unburned constituents, such as hydrocarbon and carbon monoxide, present in the exhaust gases emitted from internal combustion engines. One of the most effective arrangements devised to accomplish this reduction is the air injection system. In this system, an engine driven air pump delivers air to the stream of hot exhaust gases as they are emitted from the engine combustion chambers. Utilizing the heat of the exhaust gases, the injected air supports additional burning of exhaust gases in the engine exhaust passages to thereby reduce the amount of unburned constituents in the exhaust gases discharged to the atmosphere.

It has now been found that sufficient air induction can be obtained without the use of an engine driven air pump by utilizing a suitably tuned exhaust system to obtain maximum air flow induced by exhaust pressure pulsations in the exhaust system of the engine. Such a system is described in detail in copending U.S. application Ser. No. 85,379 filed on Oct. 30, 1970 now U.S. Pat. No. 3,653,212, in the names of Richard A. Gast and Harry R. Mitchell. In this type of exhaust emission control system, an internal combustion engine having an N number of combustion chambers is provided with one or more exhaust conduits, each including an exhaust manifold and an exhaust pipe, and each of the exhaust conduits being connected to a maximum of four or N/2 number of combustion chambers. Each exhaust manifold is provided with an air induction unit having passages extending into the exhaust manifold to direct air toward the combustion chambers exhausting into that exhaust manifold, the passages being connected by an air induction valve to the atmosphere. Each of the exhaust conduits is of a predetermined length for a particular range of engine operating speeds to effect maximum flow of air into the exhaust system.

It is, therefore, a principal object of this invention to provide an improved exhaust emission control system having an air induction valve adapted to prevent backfiring of the engine during engine deceleration and to prevent the egress of exhaust gases from the air induction unit of this system to the atmosphere.

Another object of this invention is to provide an improved exhaust emission control system having an air induction valve provided with a plurality of check valves to control the flow of induced air while preventing backflow of exhaust gases, the check valves being provided with thermostatic stops which force the check valves to a closed position during high operating temperature conditions which conditions would occur during reverse flow of exhaust gases.

These and other objects of the invention are obtained by means of an exhaust emission control system for an internal combustion engine having an induction passage and N number of combustion chambers wherein the system comprises exhaust conduits each including an exhaust manifold and an exhaust pipe with the exhaust conduit preferably being connected to not more than N/2 combustion chambers in the case of a V-8 engine, for example, and an air induction unit having passages to deliver air to the stream of exhaust gases as they are emitted from the combustion chambers, and an air induction valve to control the flow of air into the air induction system. The air induction valve consists of a housing defining a passage through which air can flow and including an inlet in communication with the atmosphere and a discharge connected to the air induction unit. Check valves, provided in the passage, are responsive to sub-ambient exhaust pressure pulsations to control the flow of air through the air induction unit to the combustion chambers while preventing the backflow of exhaust gases. A pressure responsive diaphragm actuated valve is used to control the flow of air to the check valves and is responsive to pressure changes in the induction passage to the engine, a timing valve being provided to effect a control equalization of pressure on opposite sides of the diaphragm. Thermostatic stops are provided for each of the check valves and are positioned so that under high temperature conditions, which conditions will occur as the exhaust gases flow back toward the check valves, the thermostatic stops are forced against the check valves pushing the same against their seats to prevent the discharge of exhaust gases through the air induction valve.

For a better understanding of the invention, as well as other objects and further features thereof, reference is had to the following detailed description of the invention to be read in connection with the accompanying drawings, wherein:

FIG. 1 is a perspective view of a V-8 internal combustion engine having an exhaust emission control assembly with an air induction valve constructed in accordance with the invention;

FIG. 2 is an enlarged top view of the air induction valve of FIG. 1, with parts broken away to show details of its structure and showing the reed valves closed by thermostatic stops;

FIG. 3 is a sectional view taken along line 3—3 of FIG. 2;

FIG. 4 is a sectional view of the air induction valve of FIG. 2 showing the thermostatic stops in position to allow normal operation of the reed valves; and, FIG. 5 is an enlarged view of a portion of FIG. 4 showing the details of the timing valve.

Referring now to FIG. 1, there is illustrated an internal combustion engine 10, shown as a V-8 engine for purposes of illustration only, which is provided with a carburetor 11 and an air cleaner 12 thereon mounted to supply an air-fuel mixture to the induction passages, not shown, of the engine. Each bank of cylinders of the engine is provided with an exhaust manifold 13 connected to an exhaust pipe 14. Each of the exhaust manifolds has an air induction unit in the form of an air manifold 15 positioned adjacent to it which is provided with a series of passages in injection tubes 16 extending into the exhaust manifold and terminating downstream of and closely adjacent to the exhaust valve in each of the cylinders, not shown, whereby air delivered through these injection tubes is injected into the stream of exhaust gases adjacent to the combustion chamber exhaust valve.

Each of the air manifolds is connected by a suitable conduit, such as conduit coupling 17 to the outlet of an air induction valve, generally designated 30, constructed in accordance with the invention, which is suitably supported on the engine 10. Clean air is supplied to the air induction valve 30 by means of an air inlet hose 18, which in the arrangement shown, for purpose of illustration only, has its inlet connected to the air cleaner 12 downstream of the filter element, not shown, therein. For a purpose to be described, the air induction valve 30 is also suitably connected to the induction passage of the engine, as for example, by being connected to the air-fuel intake manifold 19 of the engine by a hose conduit 21.

In the exhaust emission control system shown in FIG. 1, exhaust system pressure pulsations in the exhaust system of the engine are used to induce air into the exhaust ports of the engine via the air injection tubes previously described. High speed check valves are used in the air induction valve 30 to allow air to flow into the exhaust port when the exhaust pressure in the exhaust system fluctuates below atmospheric pressure. These sub-ambient depressions occur because the pressure waves produced by combustion chamber flowdown reflect from the open end of an exhaust pipe as an expansion wave. Pressure waves from all cylinders connected to a common exhaust pipe combines to form a composite wave. To induce sufficient air for emission control, as required by current and proposed emission control standards, the exhaust system must be tailored to produce positive pulsation frequencies which the check valve of the air induction valve can follow effectively.

In order to produce maximum air flow over a suitably wide range of engine speeds, it is desirable that not more than four combustion chambers exhaust into an exhaust conduit and that each exhaust conduit be maintained isolated from any other exhaust conduit for a predetermined distance to effect tuning of this exhaust conduit. After this predetermined length for each exhaust conduit, they can be connected in a suitable manner for exhaust to a common muffler, not shown if so desired.

Thus, in FIG. 1, both the right and left-hand banks of the engine would be provided with left and right-hand exhaust manifolds, the right-hand exhaust manifold only being shown, and right and left-hand exhaust pipes 14 and 14a, respectively, the length of each exhaust conduit thus formed by an exhaust manifold and exhaust pipe would be of a preferred length, as disclosed in the aforementioned Gast et al U.S. application Ser. No. 85,379, after which they could be connected by a suitable Y-connection 22 to a common muffler and exhaust pipe, not shown. It should be appreciated that in the case of a six cylinder engine, not shown, if the engine is a V-6, each bank of the cylinders could be isolated as in the V-8 engine of FIG. 1, whereas if it is an in-line six cylinder engine, exhaust manifolding could be made on a 3—3 basis or a 4–2 basis, the 3—3 cylinder arrangement being preferred since it will provide higher induced air flow rates over a wider speed range than the 4–2 cylinder arrangement.

Referring now to FIGS. 2, 3, 4 and 5, there is shown an air induction valve 30 adapted to supply air to opposite banks of the V-8 engine of FIG. 1. In the operation of the air induction valve 30, atmospheric air flows through air inlet hose 18 through flanged inlet duct 34 of the valve casing past a normally open control valve 71 into inlet chamber 38. From the chamber 38, the air flows through a plurality of reed type check valves 51 which are adapted to open as the exhaust manifold pressure drops below atmospheric to permit air flow through the outlet 42 of reed valve covers 32 for discharge through the air induction unit into the exhaust system.

In order to prevent backfire, the control valve 71 is connected for actuation by a pressure responsive diaphragm which will close the control valve 71 to prevent air injection during engine deceleration. Intake manifold vacuum is supplied to the upper side of the diaphragm so that during deceleration, the high induction vacuum will, in effect, pull the diaphragm upward to close the control valve 71. A timing valve is used to gradually effect a balance of the pressure on the opposite side of the diaphragm so that the control valve 71 is closed only for a predetermined interval.

As illustrated, the air induction valve 30 consists essentially of a multiple piece housing having a central or main body 31, opposed discharge casings or reed valve covers 32, a bottom cover 33, and a flanged inlet duct 34. In the embodiment illustrated, a pyramid reed valve assembly, generally designated 35, is mounted to each side of the main body 31. The pyramid reed valve assembly 35, as seen in FIGS. 2 and 4, is secured, together with a gasket 36, between the rolled-over annular flange 37 of the main body 31 and the end flange of a discharge casing 32. Each of the discharge casings 32 thus encloses a pyramid reed valve assembly 35 and, they together with the central main body portion 31 form a central inlet chamber 38 and, outboard and on opposite sides thereof, the discharge chambers 41. Discharge chambers 41 are placed in communication with air manifold 15 by conduit couplings 17, each threadably engaging the externally threaded outlet 42 of a discharge casing 32.

The inlet chamber 38 is placed in communication with atmospheric air by an aperture 43 in the upper flange 44 of the central main body 31 and by the flanged inlet duct 34 which is suitably secured to the upper flange 44 with a gasket 45 sandwiched therebetween by means of positioning plugs 46 inserted into suitable apertures provided in the external side walls of the central main body portion 31. In the arrangement shown in FIG. 1, flanged inlet duct 34 is connected by hose 18 to the air cleaner 12, as previously described, a wire hose clamp 47 being used to secure one end of the hose to the flanged inlet duct 34.

Although two pyramid reed valve assemblies 35 are used in the embodiment of the air induction valve 30 disclosed, that is, pyramid reed valve assemblies being mounted on both the lefthand and right-hand pyramid reed valve assembly 35 only the righthand unit is illustrated and described in detail, since each of the pyramid reed valve assemblies is identical. In the preferred embodiment, each pyramid reed valve assembly 35 includes a pyramidal valve seat member 50 for reed valves 51 and a thermal reed valve spring retainer 52. The valve seat member 50 is shown as being of hollow frusto-pyramidal form with four inclined side walls 53, an end wall 54 and a flanged portion 55 around the base of the pyramid. In each of the side walls 53 there is provided an aperture or port 56, circular in configuration and positioned closely adjacent to the end wall 54. The portion of each side wall surrounding the aperture or port 56 therein has a smooth outer annular surface lying in a plane above the extremity of the end wall to provide a valve seat 57 for engagement by a reed valve 51.

Each reed valve 51, formed of a suitable thin flexible material, is secured at one end by rivets 58 to a side wall 53 with its free end positioned to cover the port 56 with which it cooperates. As shown more clearly in FIG. 2, the reed valve is perforated between the fixed end and its free end to provide connecting leg portions 59. The fixed end of each reed valve is also provided with suitable apertures therein through which the rivets 58 extend to thereby prevent lateral movement of the reed valve with respect to its valve seat.

The free end of the reed valve 51 is of a length to extend sufficiently over the farthest extremity of the valve seat 57, as seen in FIG. 4, to permit the outermost free end of the reed valve to overhang this seat. It has been found advantageous to provide for this overhang of the outermost free end of the reed valve because, during operation, the reed valve flexes sinusoidally with the free end bending down. Thus, if the reed valve did not overhang its seat sufficiently, the free end of the valve, which is bent downward during closure, would initially contact the seat to cause secondary flexing of the reed valve and, as this is repeated over an extended number of cycle, it will cause damage to the reed valve, such as breaking or splitting of the reed element. With the free end of the reed valve overhanging the valve seat, as disclosed, the downward bent free end of the reed valve will overhang the valve seat, and, because of this overhang, it will not engage the valve seat and therefore, there will be no secondary flexing of the reed valve. By eliminating this secondary flexing of the reed valve during each closing cycle of the valve, an increase in the useful life of the reed valve is effected.

In operation, each of the reed valves 51 acts as a check valve to permit air to be drawn through the flanged inlet duct 34 into inlet chamber 38 for discharge through the reed valve into discharge chamber 41 for delivery to the injection tubes 16 by exhaust pressure pulsation, as previously described, while preventing exhaust backflow into the inlet chamber 38.

In order to assist in the prevention of exhaust backflow, reed valve spring retainer 52 is formed of suitable bimetallic material to act as a thermostatic stop for the reed valves and, being moveable with an increase in temperature, to force the reed valves against their valve seats as the exhaust gases flow back toward the reed valves. In the embodiment shown, the thermal reed valve spring retainer 52, of suitable bimetallic material as previously described, takes the form of an end wall 61, secured to mounting post 62 on the end wall 54, as by staking over the free end of the mounting post, with multiple spring fingers 63 extending from the end wall 61 over the reed valves with which they cooperate. Thus, the thermal reed valve spring retainer 52 is of an open frusto-pyramidal from complementary to the valve seat member 50 and acts as a temperature responsive element to hold the reed valves closed against their seats during certain adverse operating conditions as described above.

As shown in FIG. 4, each spring finger is normally spaced from its corresponding reed valve so that the reed valve is free to open. However, with an increase in temperature, the fingers will move in the direction of the arrow A shown in FIG. 4 whereby the space between the spring finger in the reed valve decreases as the temperature increases. Thus, under high temperature conditions, which exist as exhaust gases flow back toward the reed valve to cause a sharp radiant temperature increase at the reed valve area, the spring fingers are forced against the reed valves as shown in FIG. 2 to push them against their seats thus preventing backflow of exhaust gases into the inlet chamber 38.

Air flow through flanged inlet duct 34 into the inlet chamber 38 is controlled by a valve 71 secured by retainer 72 to the stepped stem 73 of valve stem 74, the reduced end of the stem being staked over retainer 72. Valve 71 is adapted to close against valve seat 65 on the base of the flanged inlet duct 34, but is normally held open with respect to this seat by spring 75 which encircles stem 73 with one end of the spring engaging the bottom of the main body 31 and the other end engaging the annular base of valve stem 74.

Movement of the valve 71 from the open position shown in FIG. 4 to the closed position, not shown, against valve seat 65 is affected by means of diaphragm 76. The outer periphery of diaphragm 76 is secured against the flange of the bottom cover 33 which in turn is held against the underside of the main body 31 by the rolled over annular flange 66 of the main body 31. Diaphragm 76 is provided with a central circular opening and is clamped between the annular base of the valve stem 74 and the annular outer end of a centrally apertured retainer 77 which encircles the diaphragm around the opening therein and which is staked in place by means of pins 78 protruding from the annular base of the valve stem. The diaphragm 76 thus forms with the bottom cover 33 and the centrally depressed portion of the main body 31 the chambers 80 and 81.

Communication between the two chambers 80 and 81 is controlled by means of a timing valve 82 also held in position by the retainer 77 against the bottom of the annular base of the valve stem 74. Valve 82, which is a disc of flexible material, is provided with an arcuate slot 83 therein to form a flapper bleed valve portion which overlies an annular recess in the annular base of the valve stem with the arcuate slot therein in communication via one or more bleed grooves 84 and a passage 85 in the annular base of the valve stem with the chamber 80. A conduit 86 connects chamber 80 via hose conduit 21 to the intake manifold 19 of the engine induction system.

During engine deceleration, the high induction vacuum pulls diaphragm 76 upwardly against the bias of spring 75 to cause valve 71 to seat against its valve seat 65, thus blocking flow of air to the injection tubes. A seal 87 surrounds the stem 73 to separate inlet chamber 38 from chamber 80. If this seal were not present, air flow from inlet chamber 38 would bleed into chamber 80 and reduce the vacuum causing the diaphragm 76 to flutter and valve 71 to chatter.

As previously described, during engine deceleration, a high vacuum raises diaphragm 76 to close valve 71. At the same time, the timing valve 82 is closed, but air can bleed between chambers 80 and 81 through the bleed groove 84 previously described. After a period, determined by the size of the bleed groove, the pressure in chambers 80 and 81 will be sufficiently balanced so that the spring 75 will lower the valve 71 out of engagement from the valve seat 65. The size of the bleed groove 84 is selected so that balancing of pressure between chambers 80 and 81 will occur over a predetermined time interval so that valve 71 is closed only for this time interval.

If, however, before the pressure in chamber 80 is balanced with that in chamber 81, the engine is suddenly accelerated, the pressure in intake manifold 19, and therefore, chamber 80, will rise rapidly. As this occurs, the timing valve 82 will open placing chambers 80 and 81 in communication with each other so that the pressure in chambers 80 and 81 may be quickly balanced with respect to each other so that, in effect, valve 71 is maintained open by spring 75.

What is claimed is:

1. An exhaust emission control system for use on an internal combustion engine having an induction passage and having N number of combustion chambers, said exhaust emission control system comprising exhaust means including manifold means and exhaust pipe means with at least a first exhaust manifold means and a first exhaust pipe means, said first exhaust manifold means being connected to not more than four of said N combustion chambers, air induction means having air inlet means and air discharge means, said air discharge means extending into said exhaust means to direct air toward said combustion chambers, air induction valve means including a housing defining passage means through which air can flow and including inlet means in communication with the atmosphere and discharge means connected to said air inlet means, check valve means in said passage means responsive to subambient exhaust pressure in said exhaust means to control the flow of air to the combustion chambers, a valve means positioned for controlling air flow through said inlet means, said housing including a chamber, pressure responsive diaphragm means dividing said chamber to form first and second pressure chambers, means connecting said valve means to said diaphragm whereby said valve means is positioned by said diaphragm, conduit means extending from said first pressure chamber and adapted to be connected to the induction passage to subject said first pressure chamber to pressure in the induction passage, a timing valve including means providing a restricted passage for controlling the pressures in said first and second pressure chambers and, means normally biasing said diaphragm means in a valve opening position whereby said valve means is normally maintained in an open position.

2. An exhaust emission control system according to claim 1 wherein said exhaust means further includes a second exhaust manifold means and second exhaust pipe means, said second exhaust manifold means being connected to not more than N/2 number of combustion chambers, said first exhaust manifold means being connected to the remaining combustion chambers, said air induction valve means including a first set of check valve means to supply air to said first exhaust manifold means and a second set of check valve means to supply air to said second exhaust manifold means.

3. An exhaust emission control system according to claim 2 wherein said air induction valve means includes thermal responsive stop means positioned adjacent said check valve means to normally allow operation of said check valve means but moveable in response to temperature increases to close said check valves means upon sudden increases in temperature adjacent said thermostatic stop means.

4. An air induction valve for use in the exhaust emission control system of an internal combustion engine having an induction passage and exhaust manifold means defining a portion of a combustibles flow path and conduit means adapted to supply air to the combustibles flow path, said air induction valve comprising a housing defining a passage through which air can flow and including an inlet and discharge means, said discharge means being adapted for connection to the conduit means, reed valve seat means positioned in said passage and having therein means defining ports and a seat extending from and surrounding each of said ports, a reed member subject to curvature secured at one end to said seat and having a port closing portion, stop means for each of said reeds to limit opening of said reeds, valve means positioned for controlling air flow through said inlet, said housing further defining a chamber pressure responsive diaphragm means dividing said chamber into a first chamber and a second chamber and being operatively connected for positioning said valve means and including means to normally bias said valve means open relative to said inlet, conduit means extending from said first chamber and adapted to be connected to the induction passage to subject said first chamber to induction pressure, and timing valve means including means providing a restricted passage for equalizing the pressures in said first chamber and said second chamber after a period of time as determined by the size of said restricted passage.

5. An air induction valve according to claim 4 wherein said stop means is a thermal responsive bimetallic element adapted to hold said reed members against their seats when subjected to high temperature exhaust gases.

6. An air induction valve according to claim 4 wherein the free end of each of said reed most remote from said end secured to said seat extends over said seat when said reed is in a port closing position.

7. An air induction valve according to claim 4 wherein two opposed reed valve seat means are positioned in said passage on opposite sides relative to said inlet, each of said reed valve seat means comprises a valve seat member having a truncated pyramidal portion with four sides, an open flanged base and closed end wall, each of said sides having means defining a port, a reed being positioned on each of said sides to overlie the respective port.

8. An air induction valve according to claim 7 wherein said stop means are thermal responsive bimetallic elements each of which is of an open frustopyramidal from complementary to said reed valve seat means having an end wall secured to said closed end wall and having stop fingers extending over said reeds.

* * * * *